(12) United States Patent
Zhang et al.

(10) Patent No.: US 11,682,920 B1
(45) Date of Patent: Jun. 20, 2023

(54) SYSTEMS AND METHODS OF ACCELERATING TRANSFER IN A STATIC TRANSFER SWITCH

(71) Applicant: ABB Schweiz AG, Baden (CH)

(72) Inventors: Yuzhi Zhang, Raleigh, NC (US); Yu Du, Raleigh, NC (US); Xiaoqing Song, Raleigh, NC (US); Harish Suryanarayana, Raleigh, NC (US); Veerakumar Bose, Richmond, VA (US); Thomas Anthony Kendzia, III, Richmond, VA (US); Harshang Shah, Raleigh, NC (US); Christopher Alan Belcastro, Richmond, VA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/548,829

(22) Filed: Dec. 13, 2021

(51) Int. Cl.
*H02J 9/06* (2006.01)
*H02J 7/00* (2006.01)

(52) U.S. Cl.
CPC .............. *H02J 9/06* (2013.01); *H02J 7/0047* (2013.01); *H02J 7/00712* (2020.01); *H02J 9/068* (2020.01)

(58) Field of Classification Search
CPC ........ H02J 9/06; H02J 7/0047; H02J 7/00712; H02J 3/14; H02J 7/00716; H02J 9/002; H02J 9/007; H02J 13/0007; H04B 3/54; H05B 47/185
See application file for complete search history.

(56) References Cited

U.S. PATENT DOCUMENTS

| 10,819,098 B2 | 10/2020 | Porter | |
| 2005/0184592 A1* | 8/2005 | Marwali | H02J 9/06 307/52 |
| 2006/0006742 A1* | 1/2006 | Galm | H02J 3/007 307/87 |

(Continued)

FOREIGN PATENT DOCUMENTS

CN 109787347 A 5/2019

OTHER PUBLICATIONS

P. Cheng and Y. Chen, "Design of an Impulse Commutation Bridge for the Solid-State Transfer Switch," in IEEE Transactions on Industry Applications, vol. 44, No. 4, pp. 1249-1258, Jul.-Aug. 2008.

(Continued)

*Primary Examiner* — Lincoln D Donovan
*Assistant Examiner* — Alex W Lam
(74) *Attorney, Agent, or Firm* — Armstrong Teasdale LLP

(57) ABSTRACT

A method of operating a static transfer switch is provided. The method includes monitoring a voltage waveform for each phase of first and second power sources, and calculating flux for each phase of the power sources. The method also includes determining (i) a first flux difference between the respective flux of the first phases of the first and second power sources, (ii) a second flux difference between the respective flux of the second phases of the first and second power sources, and (iii) a third flux difference between the respective flux of the third phases of the first and second power sources. The method further includes turning off a third solid-state switch to disconnect the third phase of the first power source from a load, in response to the controller determining that the third flux difference is greater the first and second flux differences.

20 Claims, 11 Drawing Sheets

(56) References Cited

U.S. PATENT DOCUMENTS

2014/0132080 A1* 5/2014 Bush .................. H03K 17/94
                                                      307/130
2017/0126006 A1   5/2017 Pfitzer
2020/0366101 A1* 11/2020 Lim .................. H02J 3/381

OTHER PUBLICATIONS

International Search Report and Written Opinion for International Application No. PCT/US2022/081053, dated Apr. 14, 2023, 13 pages.

* cited by examiner

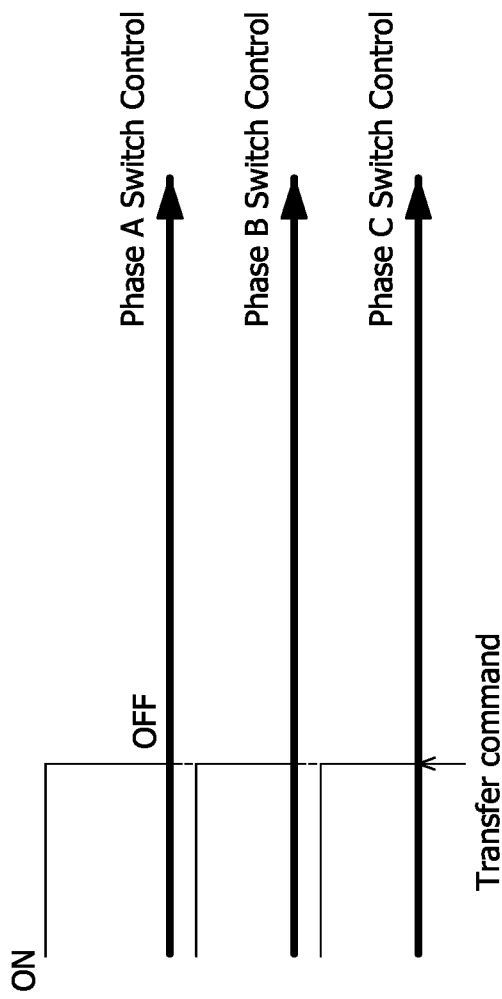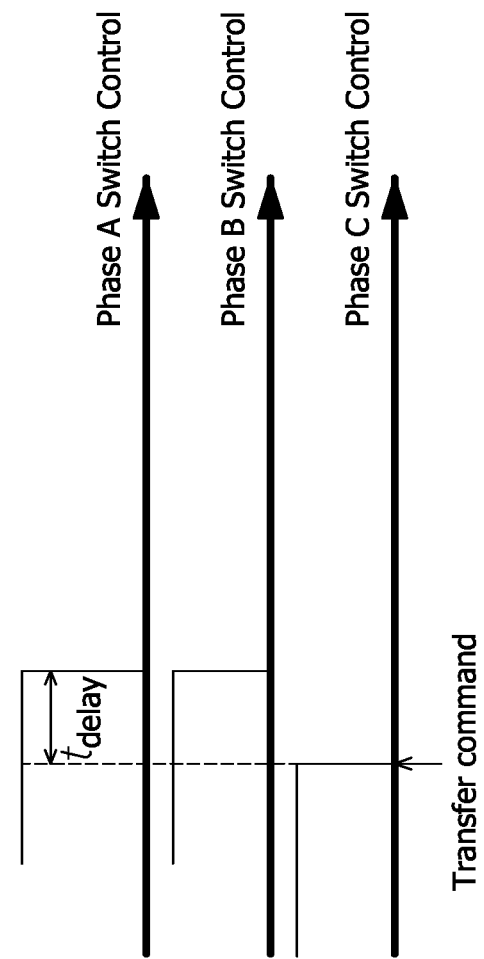

SYSTEMS AND METHODS OF ACCELERATING TRANSFER IN A STATIC TRANSFER SWITCH

BACKGROUND

The field of the disclosure relates to transfer of power, and more particularly, to systems and methods of accelerating transfer from one power source to another power source using static transfer switches.

In mission critical environments, such as data centers, it is important that a back-up power source be available in case a primary power source is unavailable or degraded to a level unsuitable to power a load. Solid-state transfer switches or static transfer switches (STSs) are used to transfer from the primary power source to the back-up power source. As a result, the transfer time is largely determined by the performance of STSs, and STSs may potentially be a single point of failure in the power system.

Known systems and methods of STSs are disadvantaged in some aspects and improvements are desired.

BRIEF DESCRIPTION

In one aspect, a method of operating a static transfer switch coupled to a first three-phase power source and to a second three-phase power source is provided. The method includes monitoring, with a controller associated with the static transfer switch, a voltage waveform for each of first, second, and third phases of the first power source and each of first, second, and third phases of the second power source, and calculating, with the controller and based on monitored voltages, flux for each of the first, second, and third phases of the first power source and each of the first, second, and third phases of the second power source. The method also includes determining, with the controller and in response to detecting a power quality event affecting the first power source, (i) a first flux difference between the respective flux of the first phases of the first and second power sources, (ii) a second flux difference between the respective flux of the second phases of the first and second power sources, and (iii) a third flux difference between the respective flux of the third phases of the first and second power sources. The method further includes turning off a third solid-state switch to disconnect the third phase of the first power source from a load, in response to the controller determining that the third flux difference is greater the first and second flux differences.

In another aspect, a static transfer switch is provided. The static transfer switch includes a first current interrupter, a second current interrupter, and a controller. The first current interrupter is configured to be coupled to a first three-phase power source, the first current interrupter including a first solid-state switch configured to selectively connect a first phase of the first power source to a load, a second solid-state switch configured to selectively connect a second phase of the first power source to the load, and a third solid-state switch configured to selectively connect a third phase of the first power source to the load. The second current interrupter is configured to be coupled to a second three-phase power source, the second current interrupter including a fourth solid-state switch configured to selectively connect a first phase of the second power source to the load, a fifth solid-state switch configured to selectively connect a second phase of the second power source to the load, and a sixth solid-state switch configured to selectively connect a third phase of the second power source to the load. The controller is electrically connected to the first current interrupter and the second current interrupter. The controller is configured to monitor a voltage waveform for each of the first, second, and third phases of the first power source and each of the first, second, and third phases of the second power source, and calculate, based on monitored voltages, flux for each of the first, second, and third phases of the first power source and each of the first, second, and third phases of the second power source. The controller is also configured to determine, in response to detecting a power quality event affecting the first power source, (i) a first flux difference between the respective flux of the first phases of the first and second power sources, (ii) a second flux difference between the respective flux of the second phases of the first and second power sources, and (iii) a third flux difference between the respective flux of the third phases of the first and second power sources. The controller is further configured to turn off the third solid-state switch, in response to determining that the third flux difference is greater than the first and second flux differences, to disconnect the third phase of the first power source from the load.

DRAWINGS

Non-limiting and non-exhaustive embodiments are described with reference to the following Figures, wherein like reference numerals refer to like parts throughout the various drawings unless otherwise specified.

FIG. 5A is an exemplary diagram of switch controls without delaying turn-off in a current interrupter.

FIG. 5B is an exemplary diagram of switch with delaying turn-off in a current interrupter.

DETAILED DESCRIPTION

The disclosure includes systems and methods of accelerating transfer from one power source to another power source. Method aspects will be in part apparent and in part explicitly discussed in the following description.

Systems and methods described herein provide reduction in the total transfer time from one power source to another power source without introducing inrush current during the transfer, where a large inrush current may trip protection devices, and cause damages to downstream devices, and/or interrupt power delivery. Any of the consequences is not desirable, especially for mission critical environments. Thyristor current interrupters are described herein as an example for illustration purposes only. Systems and methods described herein may be applied to other static transfer switches (STSs), including controllable STSs.

Figure 1A:
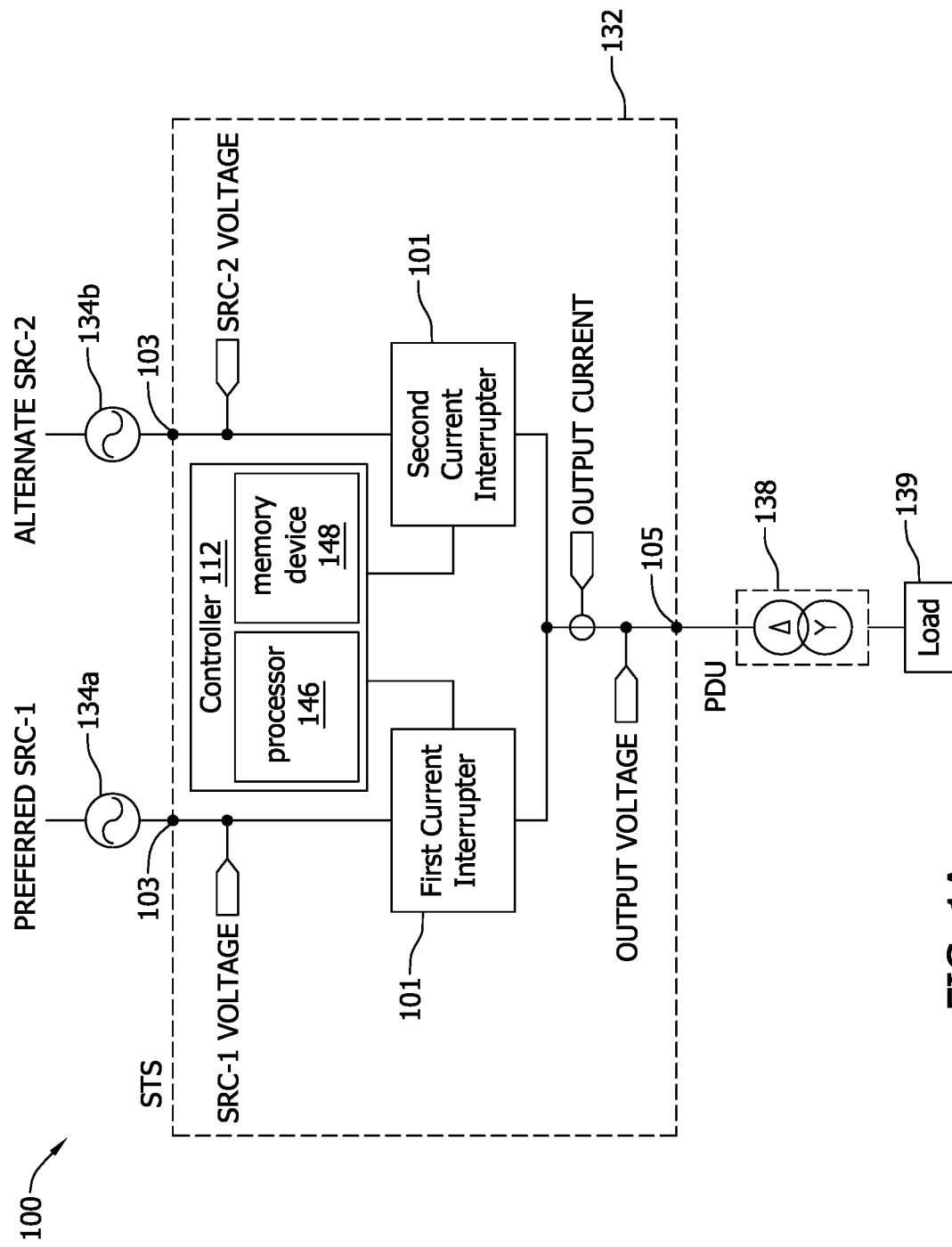
FIG. 1A is a schematic diagram of an exemplary power system.
Figure 1B:
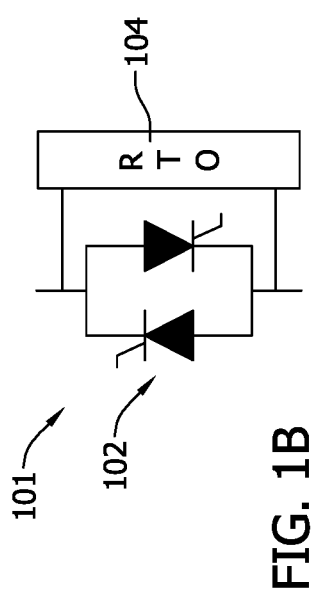
FIG. 1B is a schematic diagram of an exemplary embodiment of a current interrupter having a resonant turn-off (RTO) unit or an auxiliary turn-off unit in the power system shown in FIG. 1A.
Figure 1C:
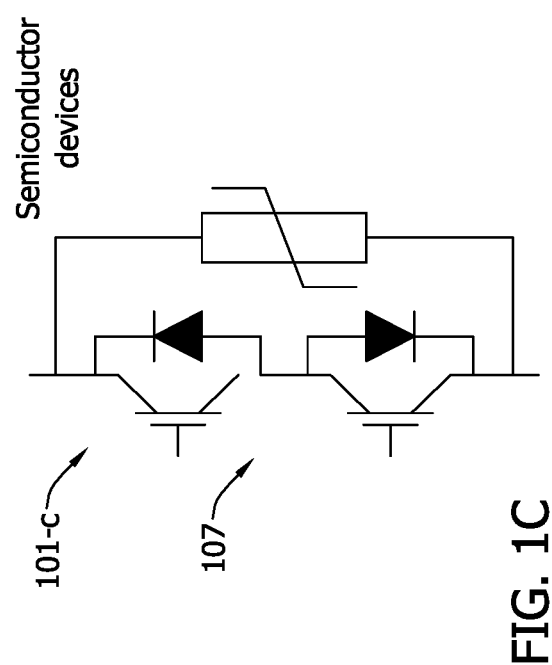
FIG. 1C is a schematic diagram of another exemplary embodiment of a current interrupter in the power system shown in FIG. 1A.

FIGS. 1A-1C show an exemplary power system 100 that includes an exemplary static transfer switch 132. FIG. 1A is a schematic diagram of power system 100. FIG. 1B is a schematic diagram of an exemplary embodiment of a current interrupter 101 of static transfer switch 132. FIG. 1C is a schematic diagram of another exemplary embodiment of current interrupter 101-c. In the exemplary embodiment, static transfer switch 132 includes a preferred input terminal 103, an alternate input terminal 103, and a load terminal 105. Preferred input terminal 103 is configured to receive electric power from a preferred voltage source 134a. The alternate input terminal 103 is configured to receive electric power from an alternate voltage source 134b. The electric power from preferred voltage source 134a and alternate voltage source 134b is in the form of an alternate current (AC) power. Load terminal 105 may be electrically connected to a power distribution unit (PDU) that includes a transformer 138. Transformer 138 is subject to saturation if the number of volt-seconds of flux applied to transformer 138 exceeds a threshold. Volt-seconds of flux, or flux, is a time integral of voltage applied to transformer 138. When the total flux exceeds the capacity of the transfer, transformer 138 saturates, where the impedance of transformer 138 drops sharply, resulting in transformer 138 drawing a large amount current, or an inrush current, from the power source of transformer 138. The inrush current may trip circuit protection devices to open, interrupt power delivery, and/or damage transformer 138 or downstream devices, which has devastating effects on a mission critical facility.

In the exemplary embodiment, static transfer switch 132 further includes a first current interrupter 101 and a second current interrupter 101. The first current interrupter 101 is electrically connected between preferred input terminal 103 and load terminal 105. First current interpreter 101 incudes one or more semiconductor switches. Second current interrupter 101 is electrically connected between alternate input terminal 103 and load terminal 105. Second current interrupter 101 also includes one or more semiconductor switches and may be implemented in a manner similar to first current interrupter 101. In some embodiments, the semiconductor switches are implemented as silicon-controller rectifiers (SCR) or thyristors. For each phase of the electric power, first current interrupter 101 includes two thyristors arranged in anti-parallel with one another. First and/or second circuit interrupter 101 may further include a resonant turn-off thyristor (RTO) circuit or an auxiliary turn-off unit 104 electrically connected in parallel with the thyristors (FIG. 1B). During the turning-off period of the main thyristors 102, a reverse current is injected by auxiliary turn-off unit 104, reducing the time for the current flowing through main thyristors 102 to zero. In other embodiments, circuit interrupter 101 includes fully controlled power semiconductor devices 107, which are devices that may be turned ON or OFF by the gate signals directly (FIG. 1C). The fully controlled power semiconductor devices may be, but not limited to, gate turn-off thyristors (GTOs), MOS controlled thyristors (MCTs), integrated gate-commutated thyristors (IGCTs), insulated-gate bipolar transistors (IGBTs), metal—oxide—semiconductor field-effect transistors (MOSFETs), or junction field effect transistors (JFETs). They may be silicon devices, wide bandgap (WBG) devices (SiC and GaN), or devices based on other materials.

In the exemplary embodiment, static transfer switch 132 further includes a controller 112. Controller 112 is electrically connected to first and second current interrupters 101 and configured to control the operation of first and second current interrupters 101. In some embodiments, controller 112 includes a processor-based microcontroller including a processor 146 and a memory device 148 wherein executable instructions, commands, and control algorithms, as well as other data and information needed to satisfactorily operate system 100, are stored. Memory device 148 includes instructions that when executed by processor 146 enable controller 112 to control operation of static transfer switch 132. In some embodiments, memory device 148 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based."

Figure 2A:
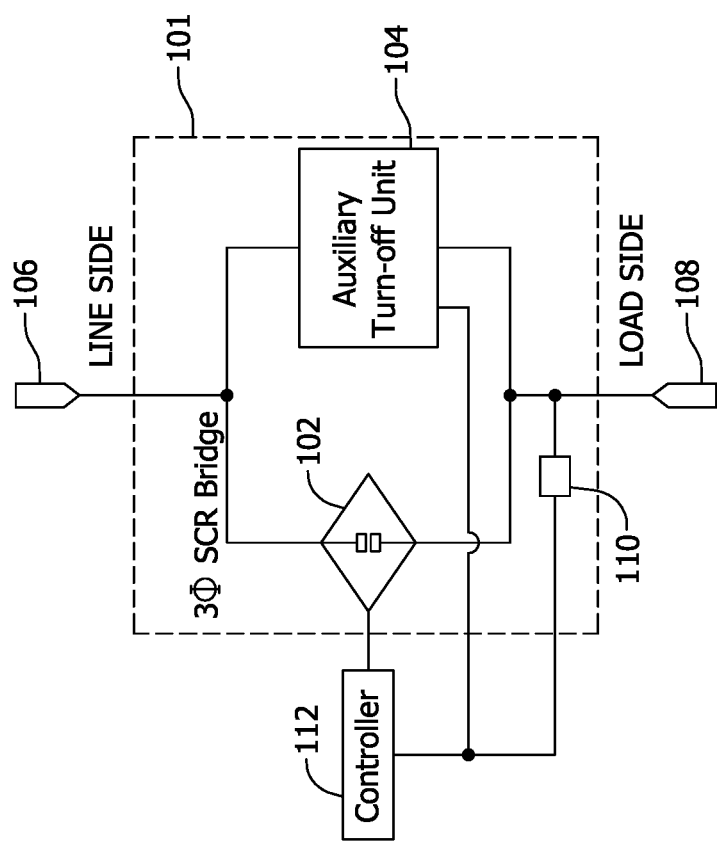
FIG. 2A is a block diagram of an exemplary power system that includes an auxiliary turn-off unit.
Figure 2B:
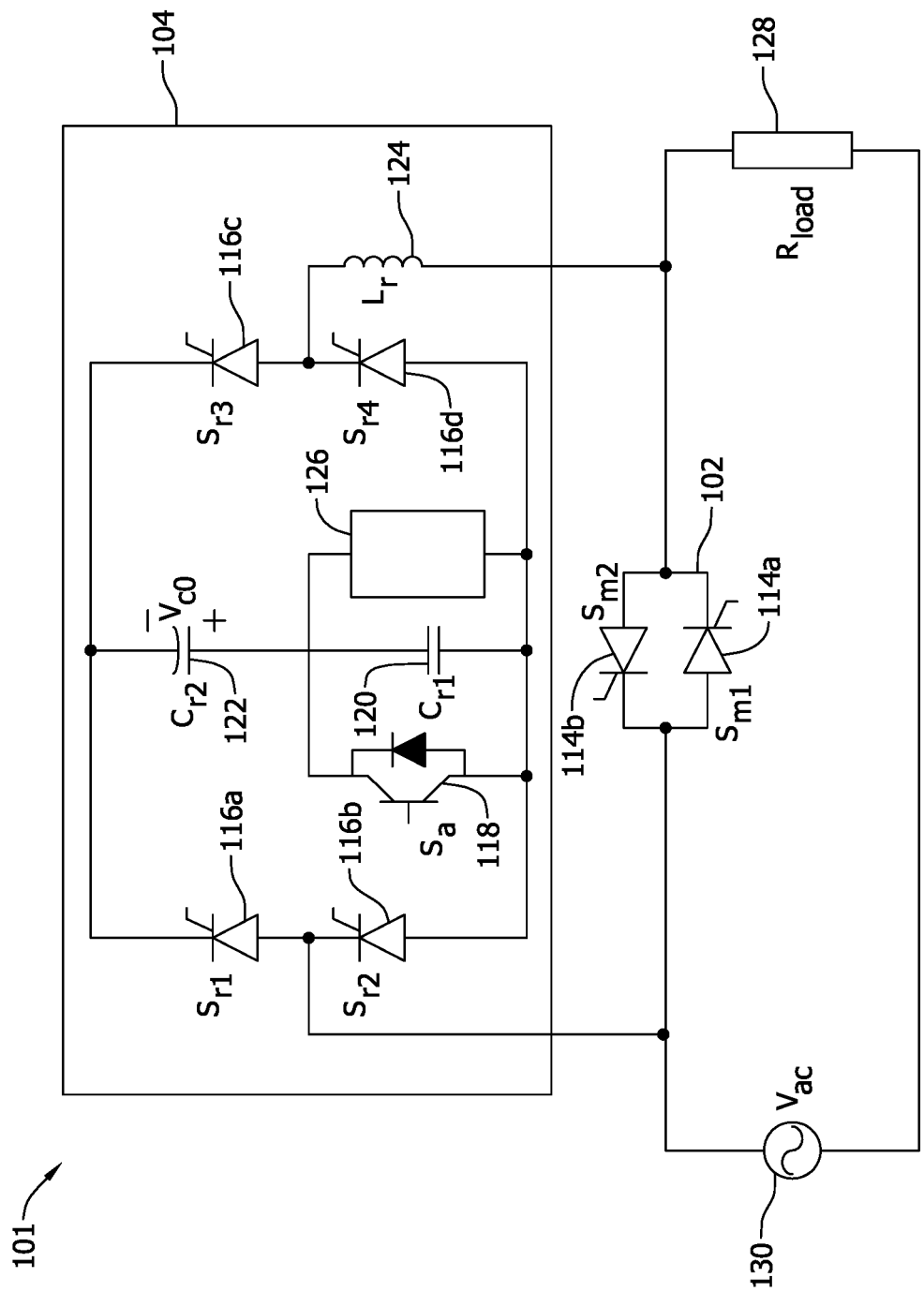
FIG. 2B is a circuit diagram of the power system shown in FIG. 2A.
Figure 2C:
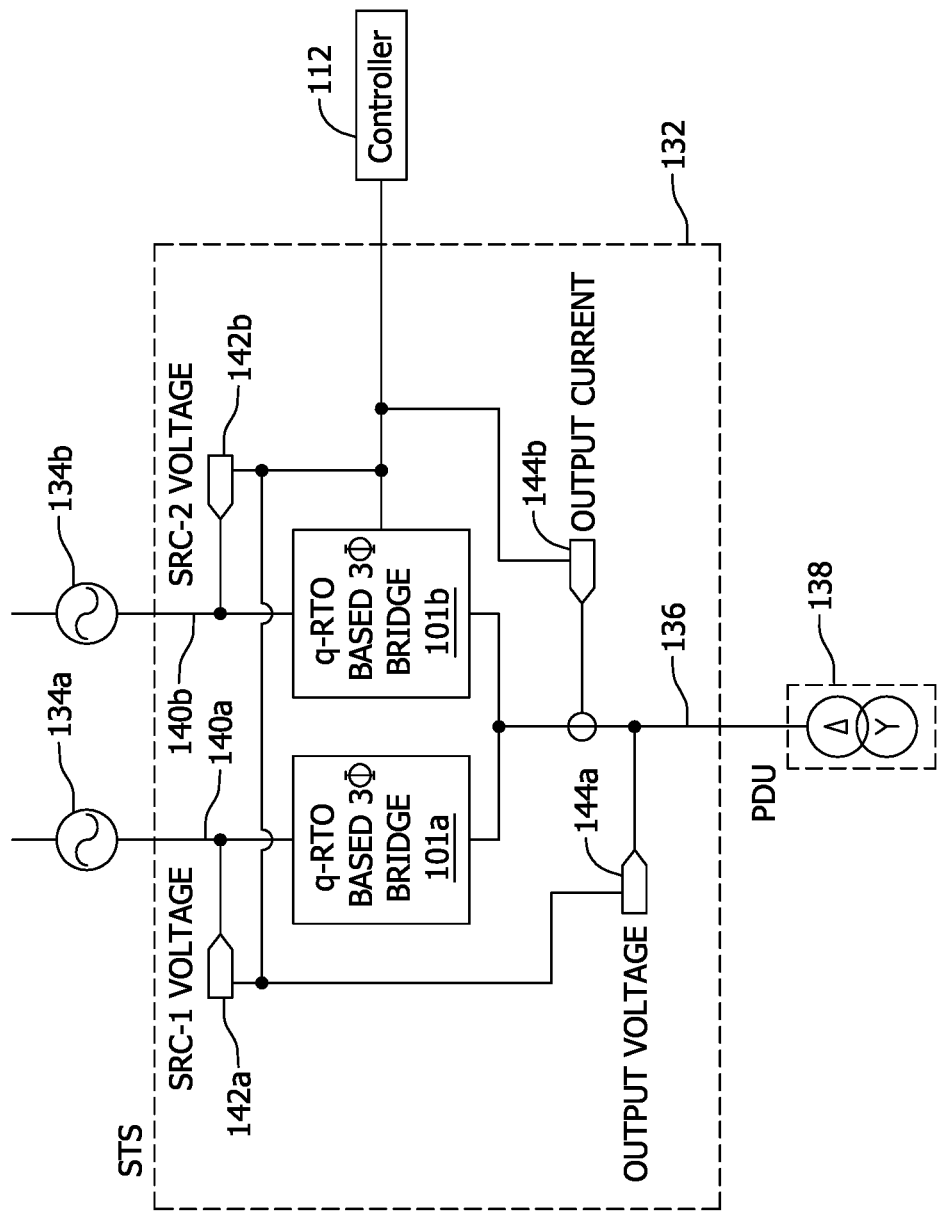
FIG. 2C is a schematic diagram of a power system that includes multiple auxiliary turn-off units shown in FIG. 2A.

FIGS. 2A, 2B, and 2C show exemplary auxiliary turn-off unit 104 (also see FIG. 1B). FIG. 2A is a schematic diagram of current interrupter 101 having auxiliary turn-off unit 104. FIG. 2B is circuit diagram of auxiliary turn-off unit 104 and main thyristors 102. FIG. 2C is a schematic diagram of power system 100 having multiple auxiliary turn-off units 104.

Thyristors (SCRs), which may be used in a variety of power applications, provide relatively high current capacity in a single package, and experience relatively low conduction power loss. Further, thyristors are generally readily available, and have proven reliability. Additionally, compared to at least some other types of power semiconductor switches, thyristors are relatively inexpensive. However, traditionally, a disadvantage of using thyristors in the power applications has been a lack of controlled turn-off capability, which may result in a time delay before thyristors interrupts an alternating current or a failure to interrupt a direct current. Moreover, compared to other semiconductor switches, thyristors typically have to wait for a current zero crossing, or the current to fall below a holding current, before the thyristor is switched off, such as changing for being in a closed state to an open state.

Delays in time before a thyristor is switched off may create dangerous conditions, and may also cause damage to associated equipment and electrical components. For example, thyristors may be used as the main power switch for micro-grid disconnect switches that connect a utility grid with micro-grids having distributed generation, including photovoltaic farms, wind mills, energy storage systems, and/or diesel generators. In the event when a power outage occurs while distributed generation continues to power the micro-grid, the micro-grid disconnect switch is required to promptly isolate the micro-grid from the utility. However, micro-grid disconnect switches that use traditional thyristors have a relatively long delay from waiting for current zero-crossing or a drop in current below the holding current to occur before the micro-grid disconnect switch may be switched off. During the delay, the fault current or energy may grow to a relatively dangerous level that, at least in certain instances, may disable and take down an entire power network.

Thyristors may also be used as a static transfer switch (STS) in connection with transferring or toggling between power supply sources. Often, in response to detection of a power quality event, an STS may use a "break-before-make" approach for power source transfer, where upon detection of a power quality event, such as a power outage, fault, or other issue with the quality and/or supply of electrical power, a first active thyristor switch is used to isolate a main power source. For example, the first active thyristor switch becomes inactive by being switched from a closed state to an open state. The isolation, however, is delayed while the first active thyristor switch waits for a current zero crossing or a drop in current below the associated holding current. Following the first active thyristor switch being opened, the second, inactive thyristor switch that is coupled to a secondary power source is closed so as to become active. The activation of the second thyristor may be delayed, such as due to downstream transformer flux matching and inrush current limits. Thus, the disconnection time associated with turning off the first thyristor switch is a significant part of the total transfer time associated with switching from the main power source to the secondary power source. For example, the transfer gap between turning off the first, active thyristor switch and turning on the second, inactive thyristor switch may sometimes be a full electrical cycle. Such a relative long gap may challenge and interrupt the mission critical load, including, for example, downstream computer based servers and databases. As a result, certain components of the load may need to be configured to ensure continued operation of the equipment or components during the relatively long transfer times, such as in the form of additional and/or oversized capacitors, which may be costly.

In the exemplary embodiment, thyristor current interrupter 101 is used as a disconnect switch. Moreover, the thyristor current interrupter 101 may be configured to interrupt the delivery of current passing through thyristor current interrupter 101, and thus, for example, interrupt the supply of a current to a downstream load. According to the illustrated, the thyristor current interrupter 101 includes one or more main thyristors 102 that is/are connected in parallel to auxiliary turn-off unit 104.

As discussed below in more detail, the inclusion of the auxiliary turn-off unit 104 may accelerate the time in which thyristor current interrupter 101 interrupts the flow of current through thyristor current interrupter 101 and/or to a load side of thyristor current interrupter 101. When thyristor current interrupter 101 is operated to interrupt current, auxiliary turn-off unit 104 is activated. The activation of auxiliary turn-off unit 104 may facilitate current being commutate from one or more main thyristors 102 to auxiliary turn-off unit 104, thereby increasing the current in auxiliary turn-off unit 104 while decreasing the current in one or more main thyristors 102. By commutating current from one or more main thyristors 102 to auxiliary turn-off unit 104, the current level in main thyristor(s) 102 may decrease to zero, or to a level below the associated holding current, in a relatively short time period, such as in about 10 microseconds (μs) to about 20 microseconds. Additionally, while facilitating a decrease in current in main thyristor 102, auxiliary turn-off unit 104 may apply a relatively small reverse bias voltage, such as a voltage of around 30 volts (V) to around 50 volts, to main thyristor 102. While the duration of the application of the reverse bias voltage by auxiliary turn-off unit 104 may vary, according to certain embodiments, auxiliary turn-off unit 104 may apply the reverse bias voltage to main thyristor 102 for about 150 microseconds (μs) to about 200 microseconds. Following application of the reverse bias voltage to main thyristor 102, main thyristor 102 is in condition to be deactivated or turned off so as to at least no longer allow passage of forward voltage through main thyristor 102. A switch of auxiliary turn-off unit 104 may then be opened so that auxiliary turn-off unit 104 may then also be turned off, thereby completing the opening of thyristor current interrupter 101.

As shown in FIG. 2A, power is received by at a line side 106 of thyristor current interrupter 101 and output to a load side 108 of thyristor current interrupter 101. According to certain embodiments, current and/or voltage passing through thyristor current interrupter 101 is monitored at load side 108 of thyristor current interrupter 101, for example, via one or more sensors 110. In one example, a sensor 110 on load side 111 of thyristor current interrupter 101 is a current sensor that monitors the current passing from, or out of, thyristor current interrupter 101. Optionally, or alternatively, sensor 110 is a voltage sensor that monitors the voltage passing from, or out of, thyristor current interrupter 101. Sensor(s) 110 may be part of thyristor current interrupter 101 and/or electrically coupled to load side 108 of thyristor current interrupter 101. In some embodiments, current and/or voltage passing to thyristor current interrupter 101 may be monitored at line side 106 of thyristor current interrupter 101, via one or more sensors.

As shown in FIG. 2A, thyristor current interrupter 101 is communicatively coupled to a controller 112 that receives information from the one or more sensors of thyristor current interrupter 101, such as sensor 110 on load side 111 of thyristor current interrupter 101. Controller 112 is configured to use information provided to controller 112 from sensor(s) 110, among other information, when determining when to activate, as well as deactivate, main thyristor 102 and/or auxiliary turn-off unit 104.

A variety of different types, configurations, and/or arrangements of thyristors are used to provide main thyristor(s) 102. For example, referencing FIG. 2B, according to certain embodiments, main thyristor 102 is a bi-directional phase controlled thyristor including two thyristor switches, namely a first main thyristor switch 114a ($S_{m1}$), and a second main thyristor switch 114b ($S_{m2}$), arranged in an anti-parallel configuration. According to such embodiments, main thyristor 102 may include a gate for each main thyristor switch 114a ($S_{m1}$), 114b ($S_{m2}$), one gate configured to turn on current in a forward direction, and the other gate turning on current flow in a reverse direction.

FIG. 2B illustrates an exemplary embodiment of auxiliary turn-off unit 104 for use with an alternating current (AC) power source 130. AC power source 130 may be preferred power source 134a or alternate power source 134b. According to the illustrated embodiment, auxiliary turn-off unit 104 includes a plurality of auxiliary thyristor switches 116a-d ($S_{r1}$-$S_{r4}$). Moreover, illustrated auxiliary turn-off unit 104 includes a first pair of auxiliary thyristor switches, such as a first auxiliary thyristor switch 116a (Sri) and a fourth auxiliary thyristor switch 116d ($S_{r4}$), and a second pair of auxiliary thyristor switches, such as a second auxiliary thyristor switch 116b ($S_{r2}$) and a third auxiliary thyristor switch 116c (56). As shown by at least FIG. 2B, according to at least applications in which alternating current (AC) power is delivered to thyristor current interrupter 101, auxiliary turn-off unit 104 may have a bridge configuration such that, during the positive half cycle of the AC current, the first pair of auxiliary thyristor switches 116a, 116d ($S_{r1}$, $S_{r4}$) are forward biased, while the second pair of thyristor switches 116b, 116c ($S_{r2}$, $S_{r3}$) are forward biased during the negative half cycle of the AC current.

The auxiliary turn-off unit 104 may also include a semiconductor switch 118, and more specifically, a fully controlled semiconductor switch having full current turn-off capability, including, but not limited to, an insulated gate bipolar transfer (IGBT) switch, a gate turn-off (GTO) thyristor, an integrated gate-commutated thyristor (IGCT), a bipolar junction transistor (BJT), a metal—oxide—semiconductor field-effect transistor (MOSFET), and a junction field-effect transistor (JFET) based on various semiconductor technologies such as silicon (Si), silicon-carbide (SiC), gallium-nitride (GaN), to name but a few examples. Thus, while the illustrated embodiment semiconductor switch 118 is depicted and described below in connection with use of an IGBT ($S_a$) as semiconductor switch 118, other types of semiconductor switches may also be used. Additionally, auxiliary turn-off unit 104 may further include a first, high voltage resonant capacitor 120 ($C_{r1}$), a second, low voltage resonant capacitor 122 ($C_{r2}$), a resonant inductor 124 ($L_r$), and a voltage-clamping unit 126. Resonant inductor 124 is positioned and configured to limit the rate of rise of the current. According to certain embodiments, resonant inductor 124 may, for example, be or include, a length of cable or wire that connects auxiliary turn-off unit 104 to main thyristor 102, and uses the inductance of the wire or cable to limit the rate of rise of current.

The configuration of auxiliary turn-off unit 104 allows auxiliary turn-off unit 104 to be an add-on module to thyristor current interrupter 101 that does not alter the mechanical structure, cooling, and/or electrical clamping connection of one or more main thyristors 102. Additionally, as auxiliary turn-off unit 104 does not continuously conduct current, auxiliary turn-off unit 104 does not generate additional power loss, and may be used with relatively low-cost discrete thyristors and IGBT switches with relatively good pulse capacity. Additionally, the resonant inductance of auxiliary turn-off unit 104 may be relatively small.

While FIG. 2B illustrates an embodiment of a thyristor current interrupter 101 for use with an AC power source 130, thyristor current interrupter 101 may also be configured for use with a direct current (DC) power source, as well as other current sources. For example, thyristor current interrupter 101 depicted in FIG. 2B may also be used in bi-directional current applications, including bi-directional current applications that use a DC power source. Additionally, while FIG. 2B illustrates a thyristor current interrupter 101 for single phase current, a thyristor current interrupter 101 may be used for each phase in multiphase applications. For example, with respect to three phase applications, a separate thyristor current interrupter 101 is used for each phase, with each thyristor current interrupter 101 having a main thyristor 102 and an auxiliary turn-off unit 104.

Additionally, as shown in FIG. 2B, according to certain embodiments, auxiliary IGBT switch 118, first, high voltage resonant capacitor 120, and voltage-clamping unit 126 are connected in parallel to each other. Further, a variety of different types of devices or components may be used as voltage-clamping unit 126, such as one or more metal oxide varistors (MOV), including, but not limited to, a plurality of MOVs arranged in parallel with each other.

In the exemplary embodiment, the second, low voltage resonant capacitor 122 may be pre-charged to a relatively low voltage, and may provide a resonant current to create a zero current crossing for main thyristor 102. Second, low voltage resonant capacitor 122 may also be configured to, after load current has been transmitted to auxiliary turn-off unit 104, provide a reverse bias voltage through auxiliary IGBT switch 118 to hold off main thyristor 102, as well as provide time for main thyristor 102 to finish an internal carrier recombination process before main thyristor 102 blocks forward system voltage. Auxiliary IGBT switch 118 is then turned off, and load current is then commutated from auxiliary IGBT switch 118 to first, high voltage resonant capacitor 120. The second resonance then starts, and first, high voltage resonant capacitor 120 limits the rate of voltage change of main thyristor 102 so as to prevent main thyristor 102 from being triggered on again in response to an occurrence in a relatively high rate of voltage change. When the voltage of first, high voltage resonant capacitor 120 reaches a sufficient level, the load current is decreased to zero or interrupted. The voltage level of first, high voltage resonant capacitor 120 is limited by the parallel voltage-clamping unit 126. Auxiliary thyristor switches 116a-d are then reversed biased and turned off, such as via operation of controller 112, and current interruption by thyristor current interrupter 101 is completed. According to certain embodiments, the total time for current interruption by thyristor current interrupter 101 may be less the 350 microseconds (µs).

According to embodiments, thyristor current interrupter 101 may also be used in connection with a transfer switch. In such embodiments, the inclusion of auxiliary turn-off unit 104 decreases the transfer time associated with a switch to a different power source. For example, FIG. 2C illustrates a block diagram of a three-phase static transfer switch 132 ("STS") having multiple thyristor current interrupters 101a, 101b ("q-RTO") according to an illustrated embodiment of the subject application. Each of thyristor current interrupters 101a, 101b may have a construction that is similar to thyristor current interrupter 101 that is depicted in FIG. 2B, but may be modified to accommodate three-phase current. Additionally, as shown, according to the illustrated embodiment, a first thyristor current interrupter 101a of static transfer switch 132 may be electrically coupled to a first power source 134a, and a second thyristor current interrupter 101b of static transfer switch 132 may be electrically coupled to a second power source 134b. Additionally, first power source 134a and second power source 134b are different power sources. For example, according to certain embodiments, first power source 134a may be a utility or grid power source, while the second power source may be an auxiliary or backup power source, such as a power source provided by a battery and/or generator, among other types of power sources. According to certain embodiments, a static transfer switch 132 may be used in at least certain critical circumstances in which the load is to be relatively continuously supplied with electrical power. For example, according to certain embodiments, output line 136 of static transfer switch 132 is coupled to a transformer 138, for example, a delta-to-wye transformer, that is coupled to a data center, telecommunication center, and/or a plurality of databases or servers, among other components.

According to exemplary static transfer switch 132 shown in FIG. 2C, first thyristor current interrupter 101a is electrically coupled to first power source 134a by a first input line 140a, and second thyristor current interrupter 101b is electrically coupled to second power source 134b by a second input line 140b. Additionally, each of first and second input lines 140a, 140b may be connected to an associated input side sensor 142a, 142b, such as a voltage sensor. Input side sensors 142a, 142b may each be communicatively coupled to a controller 112 such that information detected by input side sensors 142a, 142b may be communication to controller 112. Additionally, first and second thyristor current interrupters 101a, 101b are coupled to output line 136 of static transfer switch 132. Additionally, one or more output side sensors 144a, 144b, such as an output current sensor and/or an output voltage sensor, may be coupled to output line 136, as well as communicatively coupled to controller 112.

During normal operation, first thyristor current interrupter 101a of static transfer switch 132 are operated, such as closed, such that electrical power is supplied by first power source 134a to the load side of static transfer switch 132 via output line 136, while second thyristor current interrupter 101b is inactive, such as in an opened state, such that power from second power source 134b is not supplied to the load side of static transfer switch 132. Controller 112 monitors at least one or more input side sensors 142a, 142b and/or one or more output side sensors 144a, 144b in connection with detection of a power quality event, such as a loss in the supply of power from first power source 134a, or an issue with the quality of the power being supplied by at least first power source 134a, among other power quality events that may render the power, if any, of first power source 134a unacceptable for the associated load. Upon detection of a power quality event, controller 112 may, for each phase, commence operation of auxiliary turn-off unit 104 of first thyristor current interrupter 101a so as to accelerate the turning off of associated main thyristor 102 in a manner that is similar to the example discussed above with respect to FIG. 2B. Controller 112 then commences operation of second thyristor current interrupter 101b, such as closing second thyristor current interrupter 101b such that power from second power source 134b is then outputted from static transfer switch 132.

By accelerating the speed at which first thyristor current interrupter 101a is turned off via operation of corresponding auxiliary turn-off unit 104, the duration of the transfer time associated with static transfer switch 132 toggling between outputting power from first power source 134a to outputting power from second power source 134b, via operation of second thyristor current interrupter 101b, is decreased. Decrease in transfer time has a number of benefits, including, for example, reducing the duration of time that electrical power is not being supplied to the load from either first power source 134a or second power source 134b during the transfer, reduce the downstream impact or potential damage associated with an interruption in power supply to the load, and/or reduce the size and cost of one or more capacitors of the downstream load that are sized to provide sufficient power to the load during the duration of the transfer from first power source 134a to second power source 134b.

Following the turning off of first thyristor current interrupter 101a, and while power from second power source 134b is being outputted from static transfer switch 132, controller 112 may continue to monitor the quality and/or availability of power from first power source 134a. Upon determining that power is available, and/or is of sufficient quality, from first power source 134a, controller 112 may similarly commence operation of auxiliary turn-off unit 104 of second thyristor current interrupter 101b so as to accelerate the turning off of associated main thyristor 102 of second thyristor current interrupter 101b in a manner discussed above with respect to FIG. 2B. Controller 112 may then commence operation of first thyristor current interrupter 101a, such as closing first thyristor current interrupter 101a, such that power from first power source 134a is again outputted through static transfer switch 132.

During transfer of voltage sources from first voltage source 134a to second voltage source in critical load applications, switches for first voltage source 134a are turned off and current flowing from first voltage source 134a is settled to zero, while the flux of first power source 134a becomes constant. The turning on of switches of second voltage source 134b is waited until the flux of second power source 134b is matched with the flux of first power source 134a to avoid high inrush current from transformer 138. Flux is matched when the difference between the flux is below a threshold level, such as 1% of a maximum flux difference. The total transfer time $t_{transfer}$ is determined as:

$$t_{transfer} = t_{off} + t_{wait} + t_{on}, \quad (1)$$

where $t_{off}$ is the turn-off time of switches, which is the time that takes the switches of first power source 134a to be turned off, $t_{wait}$ is the wait time from the switches being turned off till the flux of the voltage sources matches, and $t_{on}$ is the turn-on time of switches, which is the time that takes the switches of second power source 134b to be turned on.

Because a solid-state switch connected to second power source 134b is typically turned on when flux of the two voltage sources match, the total transfer time from first power source 134a to second power source 134b is typically limited by voltage phase angle differences between phase angles or angles of first power source 134a and second power source 134b. A larger voltage angle difference usually leads to longer transfer time. In the systems and methods described herein, the turn-off timing of a solid-state switch in a static transfer switch, however, is not restricted only by the flux difference of the two voltage sources. The total transfer time may be further reduced by delaying turn-off of switches connected to first power source 134a when a voltage phase angle difference is equal to or above a threshold, for example, 270 degrees. That is, a solid-state switch for one or more phases of first power source 134a is not turned off immediately upon receipt of a transfer command. The turn-off may be delayed until the flux almost matches, if the angle differences between the two voltage sources are equal to or above a threshold.

Figure 3A:
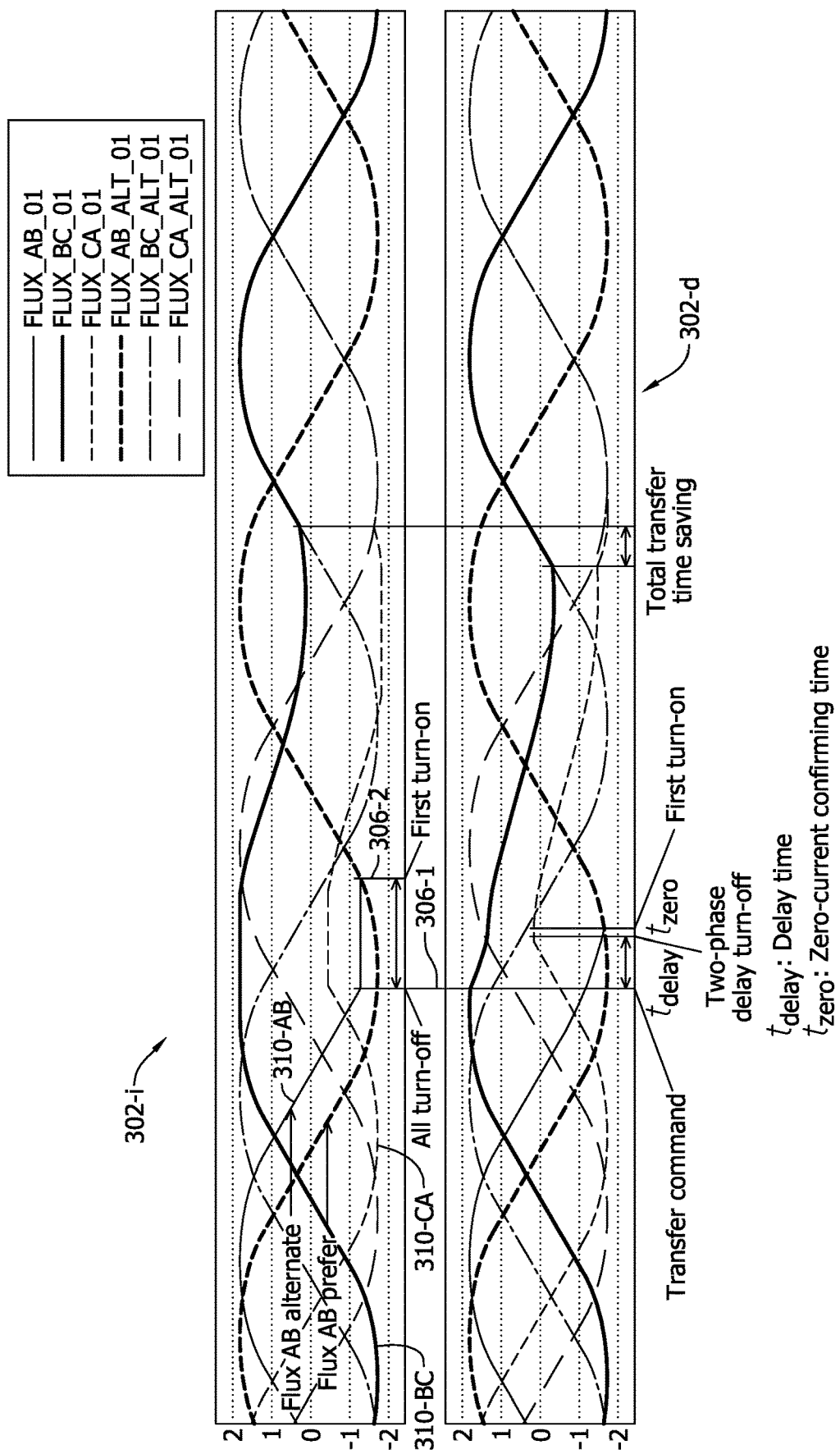
FIG. 3A are plots of flux without and with implementation of an exemplary method of operating static transfer switches (STSs).
Figure 3B:
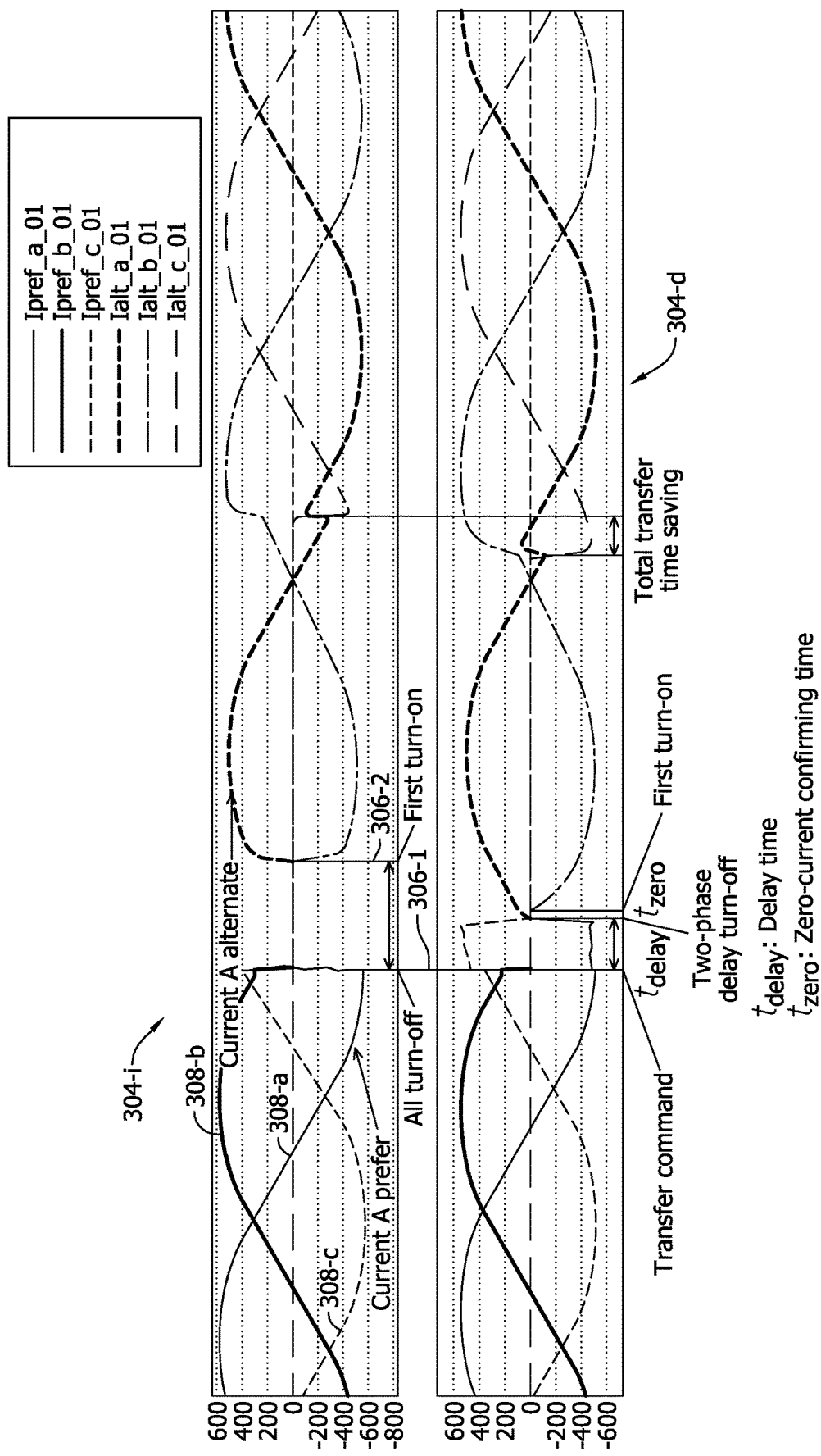
FIG. 3B are plots of currents with and without implementation of an exemplary method of operating STSs.

Transfer from preferred power source 134a to alternate power source 134b is described below as an example only for illustration purposes only. Systems and methods described herein may also be applied to transfer from alternate power source 134b to preferred power source 134a. FIGS. 3A and 3B show plots 302-i, 302-d of flux curves (FIG. 3A) and plots of 304-i, 304-d of load current curves (FIG. 3B) with or without delaying turn-off switches. When delaying turn-off is not applied (top plots in FIGS. 3A and 3B), upon receipt of a transfer command at a time point 306-1, switches of preferred power source 134a are turned off at time point 306-1, where currents 308-a, 308-b, 308-c of three phases of preferred power source 134a become zero (FIG. 3B) and flux 310-AB, 310-AC, 310-BC start to remain unchanged. Controller 112 provides a wait time until flux between two of the phases (e.g., phases A and B) matches at time point 306-2. The switches for phases A and B of alternate power source 134b are turned on at time point 306-2 (FIG. 3B) and flux between phases A and B starts to change.

In contrast, when delaying turn-off is applied (bottom plots of FIGS. 3A and 3B), upon receipt of a transfer command at time point 306-1, switches of preferred power source 134a are not immediately turned off. Controller 112 instead provides a delay time $t_{delay}$ before switches of preferred power source 134a are turned off. The threshold of voltage angle differences is chosen such that when voltage angle differences are equal to or above the threshold, flux of preferred power source 134a continues to decrease while flux of alternate power source 134b continue to increase, or vice versa, thereby reducing the time that takes the flux of two sources 134a, 134b to match. After delay time $t_{delay}$, switches of preferred power source 134a are turned off. Before switches of alternate power source 134b are turned on, a zero current confirmation time $t_{zero}$ applied to confirm currents of all phases from preferred power source 134a are $t_{zero}$ may be in the range of 10 μs-20 μs. By delaying the turn-off of switches of preferred power source 134a when angle differences between two voltage sources 134a, 134b are equal to or above a threshold level, the transfer time is reduced, for example by 12.5% from 12.2 ms to 10.6 ms. Compared to STSs with SCRs without auxiliary turn-off unit 104, 41.2% of reduction in total transfer time may be achieved, e.g., reducing from a transfer time of approximately 17 ms. The reduced transfer time helps reduce holdup time requirement in the downstream power supply, save cost in capacitors and storage in DC buses, and reduce costs and liability, such as data loss, associated with power loss during the transfer time.

In some embodiments, delaying turn-off is also applied when the voltage angle differences are less than the threshold. A small reduction in total transfer time, such as 0.1%, may also be achieved.

The operating methods described herein does not require additional hardware in the power system or STSs. The methods may be implemented on the existing controller of the power system using existing voltage and/or current sensing in the power system or STSs.

Figure 4:
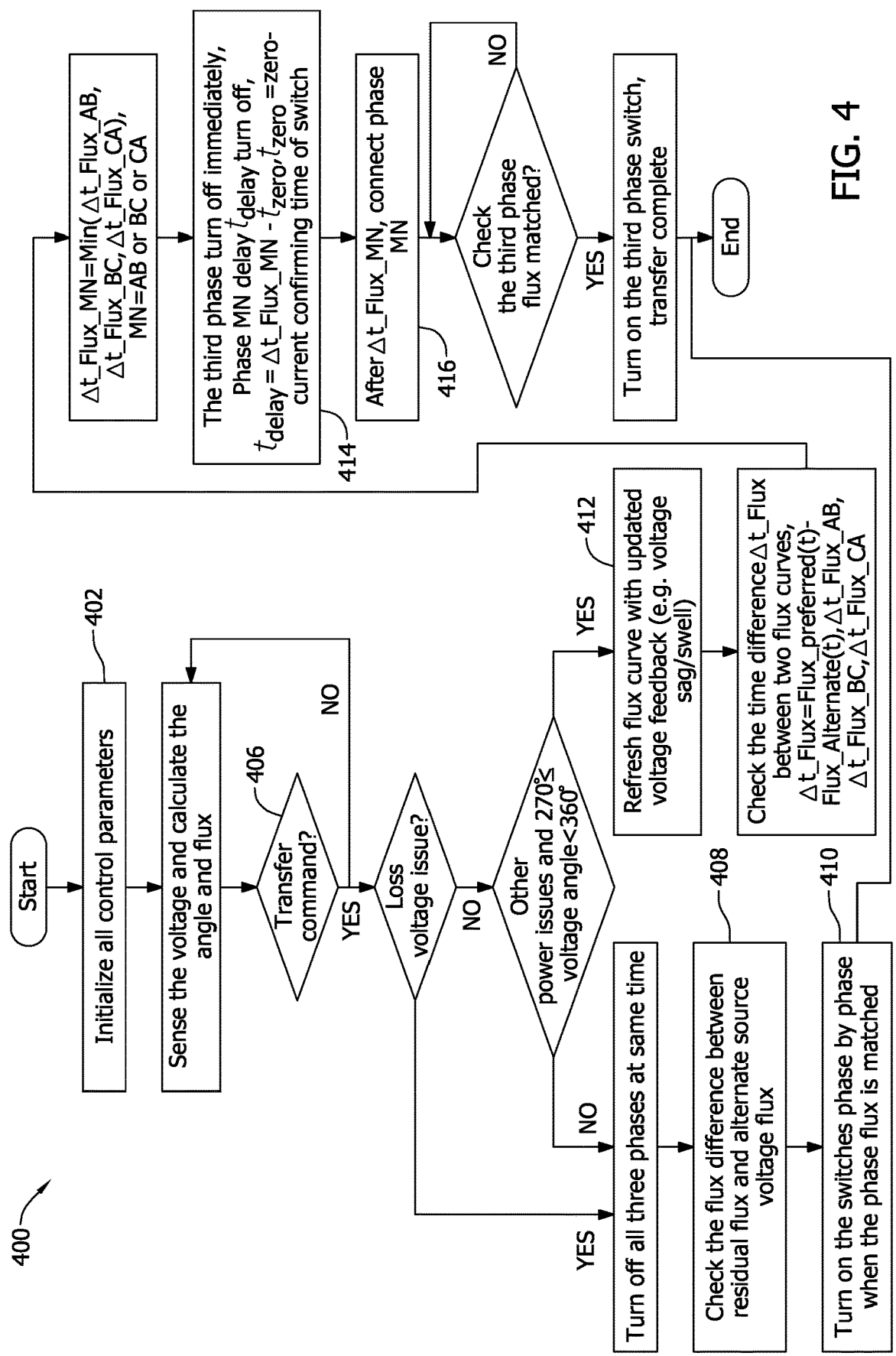
FIG. 4 is a flow chart of an exemplary method of operating STSs.

FIG. 4 is a flow chart of an exemplary method 400 of operating a static transfer switch coupled to a first three-phase power source and to a second three-phase power source. Static transfer switches may be static transfer switch 132 described above. In the exemplary embodiment, control parameters are initialized 402. The flux and phase angles of two voltage sources are calculated based on voltages detected by sensors 110, 142. The difference of two-phase flux is also calculated in each control cycle, such as at a few micro-second level. While a transfer command has not been received, the voltage/voltage waveform, angle, and flux are monitored. A transfer command may be issued in response to voltage loss or detection of a power quality event, such as a power outage, fault, or other issue with the quality and/or supply of electrical power. When a transfer command is received 406, if the transfer command is caused by voltage loss, turn-off delay is not applied. If the transfer command is caused by a power quality event, turn-off delay may be applied. In the depicted embodiment, when voltage angle difference is lower than a threshold (270°, for example), the turn-off of preferred voltage source switches will be at same time (see FIG. 5A to be discussed later). After switches for all phases of preferred power source 134a are turned off at the same time, the flux difference between residual flux of preferred power source 134a and flux of alternate power source 134b is checked 408. Re-connection of power source with load 139 is performed 410 when flux is matched phase by phase.

In the exemplary embodiment, if the voltage angle difference is equal to or greater than the threshold, delay in turn-off is applied, and the turn-off order for switches of each phase is determined by the flux difference. First, flux curves are refreshed 412 with updated voltage measurements that includes voltage sags and/or swells. The timing or order of delaying phases is determined by flux differences between phases. Delay may be applied to phases A-B, phases A-C, or phases B-C. If phases MN have the minimum flux difference, turn-off of phases MN will be delayed first, where MN refers to AB, BC, or CA, for example. The delay time $t_{delay}$ of phases MN is determined 414 by the time difference Δt_Flux_MN derived from flux differences minus $t_{zero}$, the time provided to confirm the currents of phases MN are zero. $t_{zero}$, for example, may be 50 μs. The time difference Δt_Flux_MN is the minimum among time differences of three pairs of phases Δt_Flux_AB, Δt_Flux_BC, and Δt_Flux_CA, where the time difference of a pair of phases (e.g., Δt_Flux_AB, Δt_Flux_BC, or Δt_Flux_CA) is calculated based on flux curves and is the period of time from the receipt of a transfer command to the time point when flux of preferred power source 134a and flux of alternate power source 134b match. The turn-off of the third phase may not be delayed and switches for the third phase may be immediately turned off. For example, if the turn-off delayed phases MN are phases AB, the third phase is phase C and the turn-off of phase C is not delayed, instead being performed immediately. After the switches in phases MN are turned off and the zero-current through each switch is confirmed, phases MN are connected 416 to alternate power source 134b. The third phase is re-connected after the flux of preferred power source 134a and of alternate power source 134b for the third phase is matched.

Figure 5C:
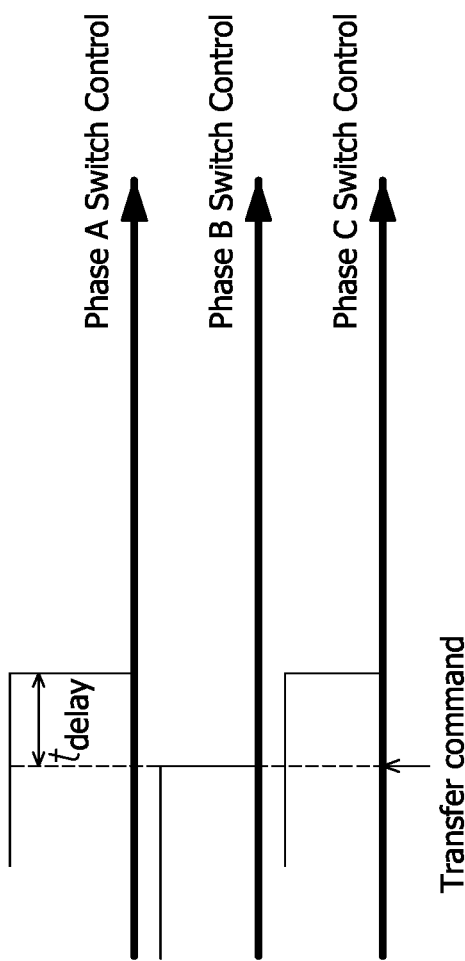
FIG. 5C is another exemplary diagram of switch controls with delaying turn-off in a current interrupter.
Figure 5D:
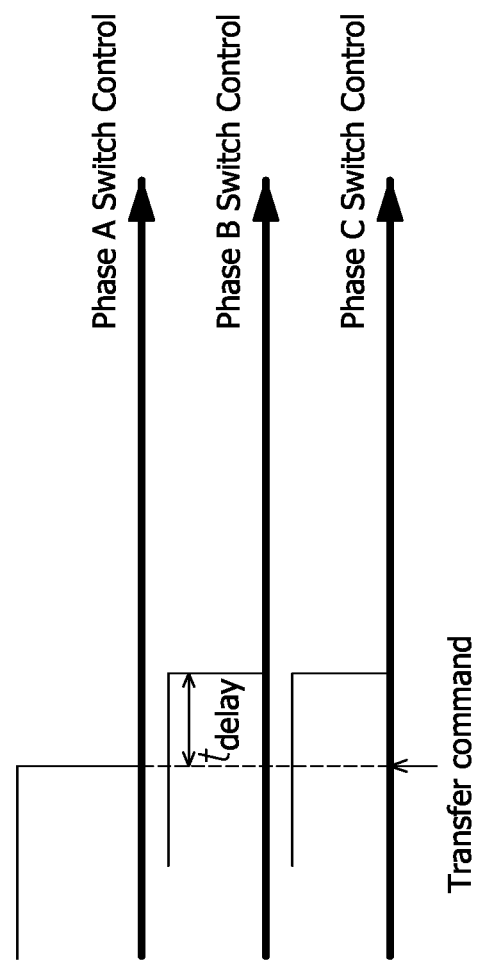
FIG. 5D is one more exemplary diagram of switch controls with delaying turn-off in a current interrupter.

FIGS. 5A-5D are controls of switches. FIG. 5A shows turn-off controls when angle differences between preferred power source 134a and alternate power source 134b are less than a threshold. FIGS. 5B-5D show controls when turn-off of two phases are delayed. When angle difference is less than the threshold, all phases A, B, and C are turned off immediately upon receipt of a transfer command (FIG. 5A). When angle difference is equal to or greater than the threshold, turn-off of switches are delayed by delay time $t_{delay}$. For example, when a delay in turn-off of phases A and B is applied, upon receipt of a transfer command, phase C is turned off immediately while the turn-off of phases A and B is delayed by delay time of $t_{delay}$ (FIG. 5B). When a delay in turn-off of phases A and C is applied, upon receipt of a transfer command, phase B is turned off immediately while the turn-off of phases A and C is delayed by delay time $t_{delay}$ (FIG. 5C). When a delay in turn-off of phases B and C is applied, upon receipt of a transfer command, phase A is turned off immediately while the turn-off of phases B and C is delayed by delay time $t_{delay}$ (FIG. 5D). In some embodiments, turn-off of all phases are delayed (not shown).

Figure 6:
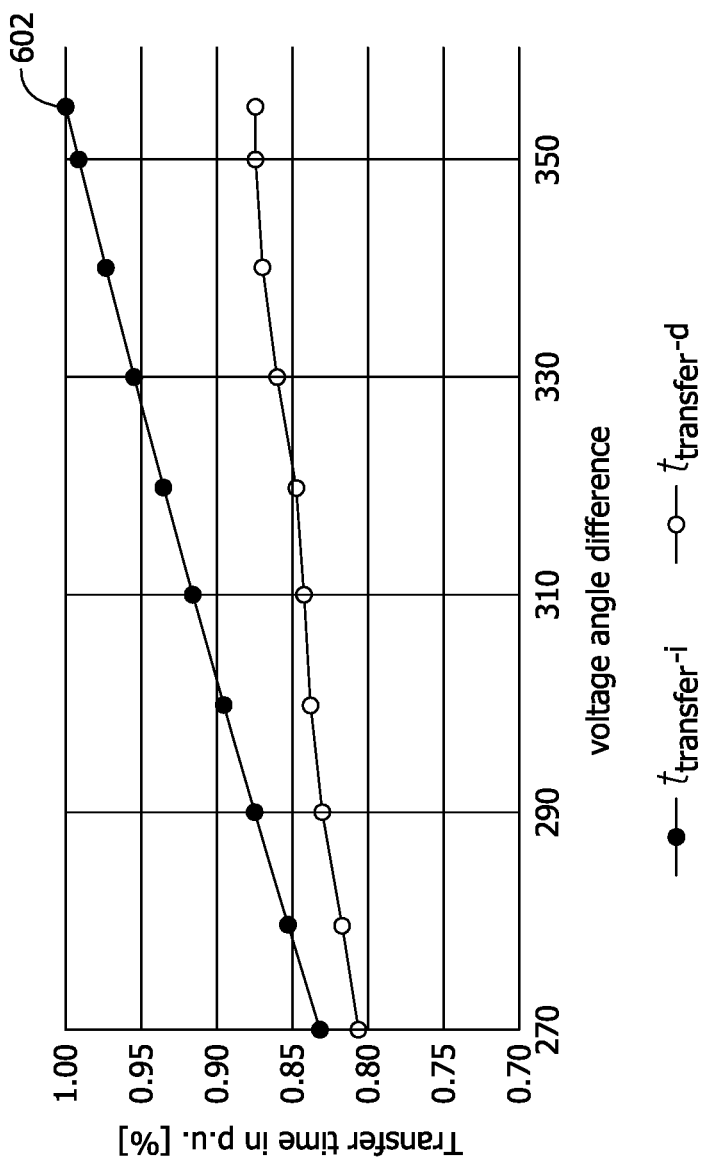
FIG. 6 is a comparison of total transfer time of a power system with or without delaying turn-off in a current interrupter.

FIG. 6 shows simulation results of average total transfer time $t_{transfer}$-i without delaying turn-off and average transfer time $t_{transfer}$-d with delaying turn-off as a function of voltage angle differences between preferred power source 134a and alternate power source 134b. In FIG. 6, the transfer time is plotted as the percentage of base transfer time 602, which is set as the maximum transfer time when delay of turn-off is not applied. As shown in FIG. 6, up to 12.5% of saving in transfer time may be achieved by delaying the turn-off of switches.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

At least one technical effect of the systems and methods described herein includes (a) reduction of total transfer time by delaying turn-off of switches; (b) reduction of transfer time without requirement of additional hardware; and (c) reduction of transfer time of a thyristor static transfer switch using an auxiliary turn-off unit.

Exemplary embodiments of systems and methods of power transfer are described above in detail. The systems and methods are not limited to the specific embodiments described herein but, rather, components of the systems and/or operations of the methods may be used independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a static transfer switch coupled to a first three-phase power source and to a second three-phase power source, the method comprising:
    monitoring, with a controller associated with the static transfer switch, a voltage waveform for each of first, second, and third phases of the first power source and each of first, second, and third phases of the second power source;
    calculating, with the controller and based on monitored voltages, flux for each of the first, second, and third phases of the first power source and each of the first, second, and third phases of the second power source;
    determining, with the controller and in response to detecting a power quality event affecting the first power source, (i) a first flux difference between the respective flux of the first phases of the first and second power sources, (ii) a second flux difference between the respective flux of the second phases of the first and second power sources, and (iii) a third flux difference between the respective flux of the third phases of the first and second power sources; and
    turning off a third solid-state switch to disconnect the third phase of the first power source from a load, in response to the controller determining that the third flux difference is greater the first and second flux differences.

2. The method of claim 1, further comprising:
    calculating, with the controller, a delay time based on flux of the first power source and flux of the second power source; and
    turning off a first solid-state switch to disconnect the first phase of the first power source from the load, in response to the controller determining that the delay time has elapsed.

3. The method of claim 2, further comprising:
    turning off a second solid-state switch to disconnect the second phase of the first power source from the load, in response to the controller determining that the delay time has elapsed.

4. The method of claim 1, further comprising:
    calculating, with the controller, a first time difference based on flux of first phases of the first and second power sources;
    calculating, with the controller, a second time difference based on flux of second phases of the first and second power sources;
    calculating, with the controller, a third time difference based on flux of third phases of the first and second power sources;
    calculating, with the controller, a delay time as a function of the first time difference, the second time difference, and the third time difference; and
    turning off a first solid-state switch to disconnect the first phase of the first power source from the load, in response to the controller determining that the delay time has elapsed.

5. The method of claim 4, wherein calculating a delay time further comprises calculating the delay time as a function of a minimum among the first time difference, the second time difference, and the third time difference.

6. The method of claim 5, wherein calculating a delay time further comprises calculating the delay time as the minimum minus a zero current confirmation time.

7. The method of claim 1, further comprising:
monitoring, with the controller, currents of the first and second solid-state switches; and
turning on (i) a fourth solid-state switch to connect the first phase of the second power source to the load and (ii) a fifth solid-state switch to connect the second phase of the second power source to the load, in response to the controller determining that the first and second solid-state switches both have zero current.

8. The method of claim 1, further comprising calculating, with the controller and in response to detecting the power quality event, an angle difference in phase angles between the respective voltage waveforms of corresponding phases of the first and second power sources, wherein determining the first, second, and third flux differences is performed in response to the controller determining that the angle difference is equal to or greater than a threshold.

9. The method of claim 8, wherein the threshold is 270 degrees.

10. The method of claim 8, further comprising simultaneously turning off (i) a first solid-state switch to disconnect the first phase of the first power source from the load, (ii) a second solid-state switch to disconnect the second phase of the first power source from the load, and (iii) the third solid-state switch to disconnect the third phase of the first power source from the load, in response to the controller determining that the angle difference is less than the threshold.

11. A static transfer switch comprising:
a first current interrupter configured to be coupled to a first three-phase power source, the first current interrupter comprising a first solid-state switch configured to selectively connect a first phase of the first power source to a load, a second solid-state switch configured to selectively connect a second phase of the first power source to the load, and a third solid-state switch configured to selectively connect a third phase of the first power source to the load;
a second current interrupter configured to be coupled to a second three-phase power source, the second current interrupter comprising a fourth solid-state switch configured to selectively connect a first phase of the second power source to the load, a fifth solid-state switch configured to selectively connect a second phase of the second power source to the load, and a sixth solid-state switch configured to selectively connect a third phase of the second power source to the load; and
a controller electrically connected to the first current interrupter and the second current interrupter, the controller configured to:
monitor a voltage waveform for each of the first, second, and third phases of the first power source and each of the first, second, and third phases of the second power source;
calculate, based on monitored voltages, flux for each of the first, second, and third phases of the first power source and each of the first, second, and third phases of the second power source;
determine, in response to detecting a power quality event affecting the first power source, (i) a first flux difference between the respective flux of the first phases of the first and second power sources, (ii) a second flux difference between the respective flux of the second phases of the first and second power sources, and (iii) a third flux difference between the respective flux of the third phases of the first and second power sources; and
turn off the third solid-state switch, in response to determining that the third flux difference is greater than the first and second flux differences, to disconnect the third phase of the first power source from the load.

12. The static transfer switch of claim 11, wherein each of the first, second, third, fourth, fifth, and sixth solid-state switches comprises a pair of anti-parallel thyristors, and wherein the static transfer switch further comprises an auxiliary turn-off unit coupled in parallel with each of the pairs of anti-parallel thyristors, the auxiliary turn-off unit configured to decrease turn-off times of the pairs of anti-parallel thyristors.

13. The static transfer switch of claim 11, wherein each of the first, second, third, fourth, fifth, and sixth solid-state switches comprises a fully controlled power semiconductor device.

14. The static transfer switch of claim 11, wherein the controller is further configured to:
calculate a delay time based on flux of the first power source and flux of the second power source; and
turn off the first solid-state switch, in response to determining that the delay time has elapsed, to disconnect the first phase of the first power source from the load.

15. The static transfer switch of claim 11, wherein the controller is further configured to:
monitor currents of the first and second solid-state switches; and
turn on the fourth and fifth solid-state switches, in response to determining that the first and second solid-state switches both have zero current, to connect the first and second phases of the second power source to the load.

16. The static transfer switch of claim 11, wherein the controller is further configured to:
calculate a first time difference based on flux of first phases of the first and second power sources;
calculate a second time difference based on flux of second phases of the first and second power sources;
calculate a third time difference based on flux of third phases of the first and second power sources;
calculate a delay time as a function of the first time difference, the second time difference, and the third time difference; and
turn off a first solid-state switch to disconnect the first phase of the first power source from the load, in response to the controller determining that the delay time has elapsed.

17. The static transfer switch of claim 16, wherein the delay time is a minimum among the first time difference, the second time difference, and the third time difference minus a zero current confirmation time.

18. The static transfer switch of claim 11, wherein the controller is further configured to calculate, in response to detecting the power quality event affecting the first power source, an angle difference in phase angle between the respective voltage waveforms of corresponding phases of the first and second power sources, and wherein the controller is configured to determine the first, second, and third flux differences in the flux in response to determining that the angle difference is equal to or greater than a threshold.

19. The static transfer switch of claim 18, wherein the threshold is 270 degrees.

20. The static transfer switch of claim 18, wherein the controller is further configured to simultaneously turn off the first, second, and third solid-state switches in response to determining that the angle difference is less than the threshold.

* * * * *